United States Patent Office 2,762,817
Patented Sept. 11, 1956

2,762,817

TRIAZOLE PHTHALIMIDES

Clarence W. Huffman, El Dorado, Ark., assignor, by mesne assignments, to Monsanto Chemical Company, St. Louis, Mo., a corporation of Delaware No Drawing. Application January 31, 1955, Serial No. 485,334

6 Claims. (Cl. 260—308)

The present invention is concerned generally with a new class of triazole derivatives, and more particularly with 1,2,4-triazole phthalimides and a method for their preparation.

The compounds which comprise my invention may be described by the following general structural formula.

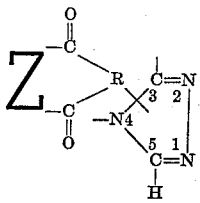

wherein the unsatisfied valence bonds of the 3 position and 4 position nuclear carbon and nitrogen respectively of the triazole residue are satisfied by either R or a hydrogen atom, with R being nitrogen. Z represents the phenylene group ($C_6H_4$) when the remaining valence bond of the 3 position carbon in the triazole ring are satisfied by R; and the endoxohexahydrophenylene group ($C_6H_8O$) when the 4 position nitrogen of the triazole residue is satisfied by R.

It is the object of the present invention to provide a new class of triazole derivatives, and a method for preparing same.

The more specific object is to prepare novel triazole phthalimides.

The compounds of the present invention are prepared by allowing a 3 or 4 position monoamino substituted triazole to react with phthalic anhydride or endoxohexahydrophthalic anhydride, depending upon which derivative is being prepared. The reactants are combined, preferably in equimolecular quantities, and heated until the reaction is completed. A solvent is not required in carrying out the reaction.

Of interest in connection with the preparation of my new compounds, is the fact that triazole phthalamic acids are unexpectedly produced when phthalic anhydride is allowed to react with 4-amino triazole having substitution on the 3 and 5 position nuclear carbons. The same is true when the endoxo anhydride is reacted with 3 amino triazole. The phthalamic acid derivatives from the subject of my copending application S. N. 485,333, filed on even date herewith.

While it would normally be expected that the reaction conditions could be varied to produce either the acid derivative or the imide, I have surprisingly found that such is not the case, and only the imide or the acid results from the reactions above enumerated, and more fully described in the examples which are to follow.

The new triazole phthalimides which I have prepared are useful for a variety of purposes. Of particular importance is their use as plant growth regulators. They also find application in polymer formation, as additives to lube oils, and as plastic modifiers.

The examples which follow illustrate in more detail the manner of producing my new compounds. Variations and modifications within the purview of those skilled in the art will be apparent.

EXAMPLE I

*Preparation of N-[4-(1,2,4-triazolyl)]- 3',6'-Endoxohexahydrophthalimide*

3,6-endoxohexahydrophthalic anhydride (16.8 g., 0.1 mole) and 4-amino-1,2,4-triazole (8.4 g., 0.1 mole) were mixed and heated at 120° C.–190° C. for thirty minutes. The crude brown crystalline solid weighed 23.1 g., M. P. 245°–255° C. Twenty-two and one tenth grams of the crude material was dissolved by hot acetonitrile (700 ml.) and treated with charcoal. Cooling in the icebox followed by filtration yielded white crystals (13.3 g., 59% yield), M. P. 269–270° C. with sintering at 254° C. Evaporation of the filtrate gave a further 5.0 g. yield of purified material making a total yield of 81%, M. P. 266–8° C. A small sample of the material was further purified by recrystallization from acetonitrile, M. P. 269° C. with sintering at 261° C. This sample was soluble in water and dilute NaOH, which is rather unusual for a phthalimide.

| Analysis | Percent C | Percent H | Percent N |
|---|---|---|---|
| Calculated for $C_{10}H_{10}N_4O_3$ | 51.7 | 4.30 | 23.9 |
| Found | 51.7 | 4.16 | 23.3 |

The use of benzene as a solvent in the reaction mixture was tried. While the same product was produced, a yield of only 52% was obtained.

EXAMPLE II

*Preparation of N-[3-(1,2,4-triazolyl)] phthalimide*

Phthalic anhydride (14.8 g., 0.1 mole) and 3-amino-1,2,4-triazole (11.2 g., 0.1 mole) were heated to 180° C.–200° C. A yellow solution formed and this liquid solidified. Heating was maintained for 30 minutes. The crude material, M. P. 289° C.–300° C., was insoluble in water, but soluble in dilute sodium hydroxide (which likewise is rather unusual for a phthalimide).

Two grams of the crude material was recrystallized three times from dimethyl formamide plus water to yield crystals, M. P. 337° C.–338° C.

| Analysis | Percent C | Percent H | Percent N |
|---|---|---|---|
| Calculated for $C_{10}H_6N_4O_2$ | 56.1 | 2.80 | 26.1 |
| Found | 56.4 | 3.39 | 25.3 |

The remaining 22.4 g. of the crude material was dissolved in warm dimethyl formamide (650 ml.) and treated with charcoal. Water (400 ml.) was added to the filtrate. After cooling in the icebox, the product was removed by filtration and washed with 100 ml. of water. Drying yielded 17.0 g. (76% yield) of first crop purified product, M. P. 336° C.–338° C., with sintering at 315° C.

Having described my invention and the manner and mode of practicing same, I claim:

1. As new chemical compounds, 1,2,4-triazolyl phthalimides having a formula selected from the group consisting of

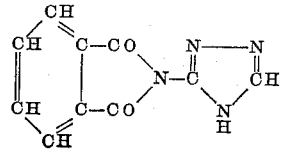

and

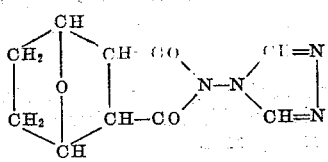

2. A process for preparing a new class of 1,2,4-triazolyl phthalimides having a formula selected from the group consisting of

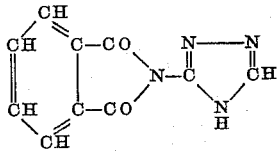

and

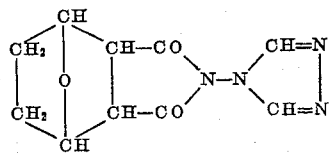

which comprises allowing a compound selected from the group consisting of 3 and 4 position monoamino substituted triazoles to react with a compound selected from the group consisting of phthalic anyhydride and endoxohexahydrophthalic anhydride.

3. A process for preparing N-[3-(1,2,4-triazolyl)] phthalimide which comprises allowing phthalic anhydride to react with 3-amino-1,2,4-triazole.

4. A process for preparing N-[4-(1,2,4-triazolyl)]-3',6'-endoxohexahydrophthalimide which comprises allowing 3,6-endoxohexahydrophthalic anhydride to react with 4 amino-1,2,4-triazole.

5. N-[3-(1,2,4-triazolyl)] phthalimide.

6. N-[4 - (1,2,4 - triazolyl)] - 3',6' - endoxohexahydrophthalimide.

References Cited in the file of this patent

Degering: Outline of Org. Nitrogen Compounds, p. 384, University Lithoprinters, Michigan (1945).